United States Patent

[11] 3,562,588

| [72] | Inventor | Horst Zielasko<br>Nordenham-Einswarden, Germany |
|---|---|---|
| [21] | Appl. No. | 877,395 |
| [22] | Filed | Nov. 17, 1969 |
| [45] | Patented | Feb. 9, 1971 |
| [73] | Assignee | Felten & Guilleaume Schaltanlagen GmbH<br>Krefeld, Germany |
| [32] | Priority | Nov. 15, 1968 |
| [33] | | Germany |
| [31] | | P 18 09 025.0 |

[54] SAFETY ARRANGEMENT FOR NONSTATIONARY ELECTRICAL APPLIANCES CONNECTED TO GROUNDED SUPPLY NETWORKS
10 Claims, 3 Drawing Figs.

[52] U.S. Cl. .................................................. 317/18,
307/127
[51] Int. Cl. .................................................. H02h 3/16
[50] Field of Search .......................................... 307/127,
131; 317/18A, 44

[56] References Cited
FOREIGN PATENTS

| 727,966 | 4/1955 | Great Britain .................. | 317/18A |
| 114,770 | 2/1942 | Australia ...................... | 317/18A |

*Primary Examiner*—James D. Trammell
*Assistant Examiner*—Harvey Fendelman
*Attorney*—Michael S. Striker

ABSTRACT: A safety arrangement for the protection of life and matter against damage from electrical current applied to nonstationary electrical appliances connected to grounded supply networks. A core-balance protective switch with a nominal tripping current below 50 milliamperes precedes the appliances. The protective conductor of the safety arrangement leads, over at least one switch contact of the protective switch, to one or several primary windings of the balance transformer of the core-balance protective switch. The total number of turns of these primary windings is at least double the number of turns of one of the primary windings for the connection of one of the phase conductors or of the neutral conductor of the supply network. In the core-balance protective switch a voltage dependent resistor arrangement is connected in series to the protective conductor with such characteristic that its resistivity is high at low voltages but very small at higher voltages. This voltage dependent resistor arrangement consists of two identical single voltage dependent resistors with oppositely directed characteristics, connected in series to each other and to a limiting resistor.

INVENTOR
HORST ZIEGASKO

INVENTOR:
HORST ZIELASKO

SAFETY ARRANGEMENT FOR NONSTATIONARY ELECTRICAL APPLIANCES CONNECTED TO GROUNDED SUPPLY NETWORKS

BACKGROUND OF THE INVENTION

The present invention resides in a safety arrangement for nonstationary electrical appliances connected to grounded supply networks. A core-balance protective switch with a nominal tripping current below 50 milliamperes precedes the appliance to be connected to the network. The protective conductor of the safety arrangement leads over at least one switch contact of the protective switch to one or several primary windings of the balance transformer of the core-balance protective switch. These primary windings have at least double the number of turns as one of the primary windings for the connection of one of the phase conductors or of the neutral conductor.

When using a core-balance protective switch with a nominal tripping current of 30 milliamperes, with this safety arrangement, the following conditions are achieved:

1. When an insulation fault of the appliance occurs the switch cuts off at a leakage current above 30 milliamperes.
2. When a protective conductor of the receptacle outlet and thus an appliance casing acquires high potential and is touched by a person who is grounded the switch cuts off at a current below 15 milliamperes.
3. A protective conductor in the arrangement remains fully effective as long as it is in working order.
4. When the protective conductor is interrupted, and when at the same time an insulation fault occurs in the appliance which is touched by a grounded person, the switch cuts off as in case 1. above at a current above 30 milliamperes.

This protective measure above, however, has one operation-caused disadvantage: The neutral conductor and thereby a protective conductor connected to it nearly always carry a slight, undangerous voltage relative to a ground potential. If, now, with the above-described safety arrangement the metal casing of a connected electrical appliance as, for a example, a hand-operated drilling machine, with protective arrangement, comes into contact with a good grounded connection, this slight neutral conductor voltage is sufficient to allow a current to flow to ground which exceeds 15 milliamperes and actuates the tripping magnet of the core-balance protective switch.

It is a specific object of the present invention to avoid this disadvantage. The object is achieved by providing in the core-balance protective switch in the circuit of the protective conductor, a series-connected voltage-dependent resistor arrangement with such characteristic that its resistance is high at small applied voltages, and low at higher applied voltages. In accordance with the present invention this voltage dependent resistor arrangement is comprised simply of two identical single voltage-dependent resistors with oppositely directed characteristics, connected in series to each other and to a limiting resistor.

Through the two single voltage-dependent resistors, the slight neutral conductor voltage is blocked in both half cycles. At full system voltage, for example at a puncture of the insulation of the connected appliance, the current is limited by the limiting resistor to a maximum value.

The novel arrangement of the present invention provides further advantages when the core-balance protective switch is built into a receptacle for a wall-type two-pole receptacle outlet with protective conductor contacts, and when a flexible appliance connection cable leads into the receptacle on the appliance side of it. When using the combined protective switch receptacle, for the advantage of avoiding faulty cutouts at undangerous neutral conductor voltages, the advantage is added that the neutralization of the protective measure by pulling the receptacle out of the receptacle outlet is unimportant, because in this case the power supply of the appliance is interrupted in all phases. Besides, even when instead of using a ground outlet according to regulations a conventional outlet is used, in which case the protective conductor is missing, the protective switch is operated as soon as a defective appliance or cable is touched by a person who stands on ground or comes otherwise in contact with ground. The cutoff takes place within a very short space of time and at nondangerous currents, of for example, in excess of 30 milliamperes.

SUMMARY OF THE INVENTION

A safety arrangement for the protection of life and matter against damage from electrical current when connecting nonstationary electrical appliances to grounded supply networks. A core-balance protective switch with a nominal tripping current below 50 milliamperes preceding the appliance, has a protective conductor connected to one or several primary windings of the balance transformer of the core-balance protective switch. The total number of turns of this primary winding is at least double the number of turns of one of those primary windings which are connected to either of the phase conductors or to the neutral conductor of the supply network. A voltage-dependent resistor arrangement is connected in series with the protective conductor which has such characteristic that its resistance is high at low voltages but is very small at higher voltages. This voltage-dependent resistor arrangement consists of two single identical voltage-dependent resistors with oppositely directed characteristics. A limiting resistor, moreover, is connected in series to this voltage-dependent resistor arrangement. A test key arrangement connects one phase conductor over a test resistor and one additional contact of the switch to the primary winding connected to the neutral conductor for checking the operability of the safety arrangement. The novel features which are considered characteristic for the invention are set forth in particular in the appended claims. The invention itself, however, both as to its construction and its principle of action, together with additional objects and advantages thereof, will be best understood from the following description of the accompanying drawings.

DESCRIPTION OF THE PREFERRED EMBODIMENT

Figure 1:
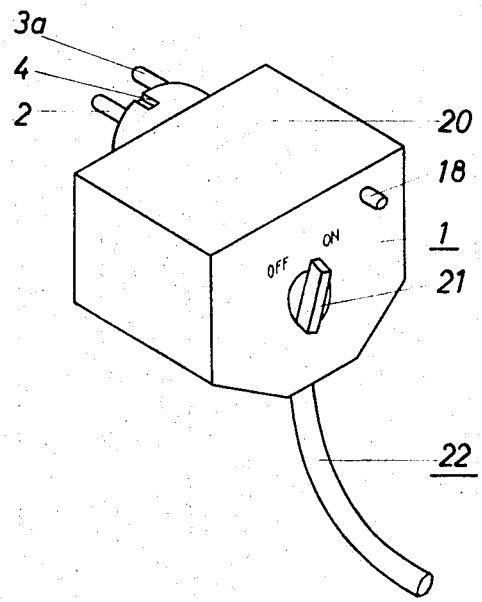
FIG. 1 is an isometric view of the receptacle containing the safety arrangement and from which a flexible cable leads to the electrical appliance to be served, in accordance with the present invention.
Figure 2:
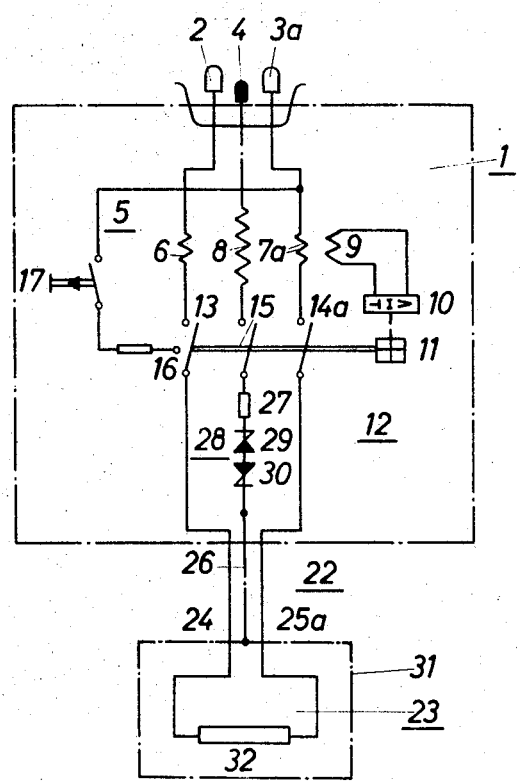
FIG. 2 is an electrical schematic diagram and shows the component details as well as their interconnections to realize a safety arrangement in accordance with the present invention.

Referring to the drawing, the receptacle 1 has two contact pins 2 and 3a for connecting to a utility supply network receptacle outlet. In addition, the receptacle 1 is provided with a protective conductor contact pin 4. The components of a core-balanced protective switch are enclosed within the casing of the receptacle 1. These components consist of a core-balanced transformer 5 with the primary windings 6 connected to pin 2, winding 7a connected to pin 3a, and winding 8 connected to pin 4. The secondary winding 9 is connected to tripping magnet 10 of switch lock 11. The latter is associated with switch 12 having the contacts 13 for primary winding 6, 14a for primary winding 7a, 15 for primary winding 8 and 16 for the testing circuit. The testing circuit consists of test switch 17 with the test key 18 and test resistor 19. The test key 18 is mounted on the front of the outer casing 20 of receptacle 1. Mounted similarly on the front of the casing 20, is rotatable type of switch knob 21 for switch 12.

A flexible cable 22 leads from the receptacle 1 to the appliance 23. It contains three insulated conductors: one conductor 24 is connected to switch contact 13, and another conductor 25a is connected to contact 14a. Connected in series with switch contact 15 is a limiting resistor 27 and a voltage-dependent resistor arrangement 28. The latter consists of two identical single voltage-dependent resistors 29 and 30 with oppositely directed characteristics so that the arrangement 28 has a high resistance at low voltages and a very low resistance at higher voltages. The voltage-dependent arrangement is connected to the insulated protective conductor 26. The protective conductor 26 is conventionally connected with the casing 31 of appliance 23 while the conductors 24 and 25a feed the appliance, represented by the load resistor 32.

The principle of operation of the arrangement, according to the invention, can clearly be understood from the drawing.

The appliance 32 is, for example, to be supplied from the utility supply network via a single phase conductor 3 and neutral conductor 2. Phase conductor 3 may be connected to either phase of the three-phase alternating current network. Thus element 3a connected to phase R, may be replaced by 3b connected to phase S, or 3c connected to phase T. It is obvious that any other arrangement, well known to those skilled in the art, may be chosen to feed appliance 32. Protective conductor 4 leads to the primary winding or windings 8 which, according to the invention, have a total number of turns at least twice as large as the primary windings 6. Winding 6 is connected to neutral conductor 2 or 7. Conductor 4 is connected to one of the phase conductors. Therefore, if due to any wrong connection or damage inside the system, the protective conductor 4 and with it the casing 31 of the appliance acquire voltage and are touched by a grounded person, a current of 15 milliamperes would be sufficient to trip the switchlock and let the switch cut off, if the tripping current of the tripping magnet would be 30 milliamperes. This is due to the fact that winding or windings 8 have twice as many turns as winding 6 or 7a.

For an insulation leakage inside the appliance, the switch would cut off at 30 milliamperes.

Small leakage currents which may occur through the protective conductor, will not trip the switch because they will be blocked by the voltage-dependent arrangement. However, heavy leakages will not cause excessive currents which may endanger the arrangement because the neutral conductor current would be limited by resistor 27.

The switch 12 is operated by turning switch knob 21. Switch lock 11 converts the rotary movement of the switch knob into a horizontal movement of a slider 33, in a manner well known by those skilled in the art and therefore not described in detail. The slider 33 operates the contacts 13, 14a and 15. However, switch lock 11 can be tripped by tripping magnet 10 in the conventional manner. The tripping magnet 10 is, thereby, excited by the current flowing through the secondary winding 9 of the core-balanced transformer 5, whenever the balance of the currents through the primary windings 6, 7a and 8 differs from zero for more than the tripping current of the arrangement.

In order to test the operability of the arrangement, the switch is operated by switch knob 21. When the key 18 is depressed, the phase conductor 3a is connected through resistor 19 to neutral conductor 2. Full phase voltage is thereby applied via primary winding 7a, to test resistor 19 which has a resistance value so as to allow current flow which just exceeds the tripping current. If the arrangement is operable, the switch will trip and cut off all connections to the utility supply network.

Figure 3:
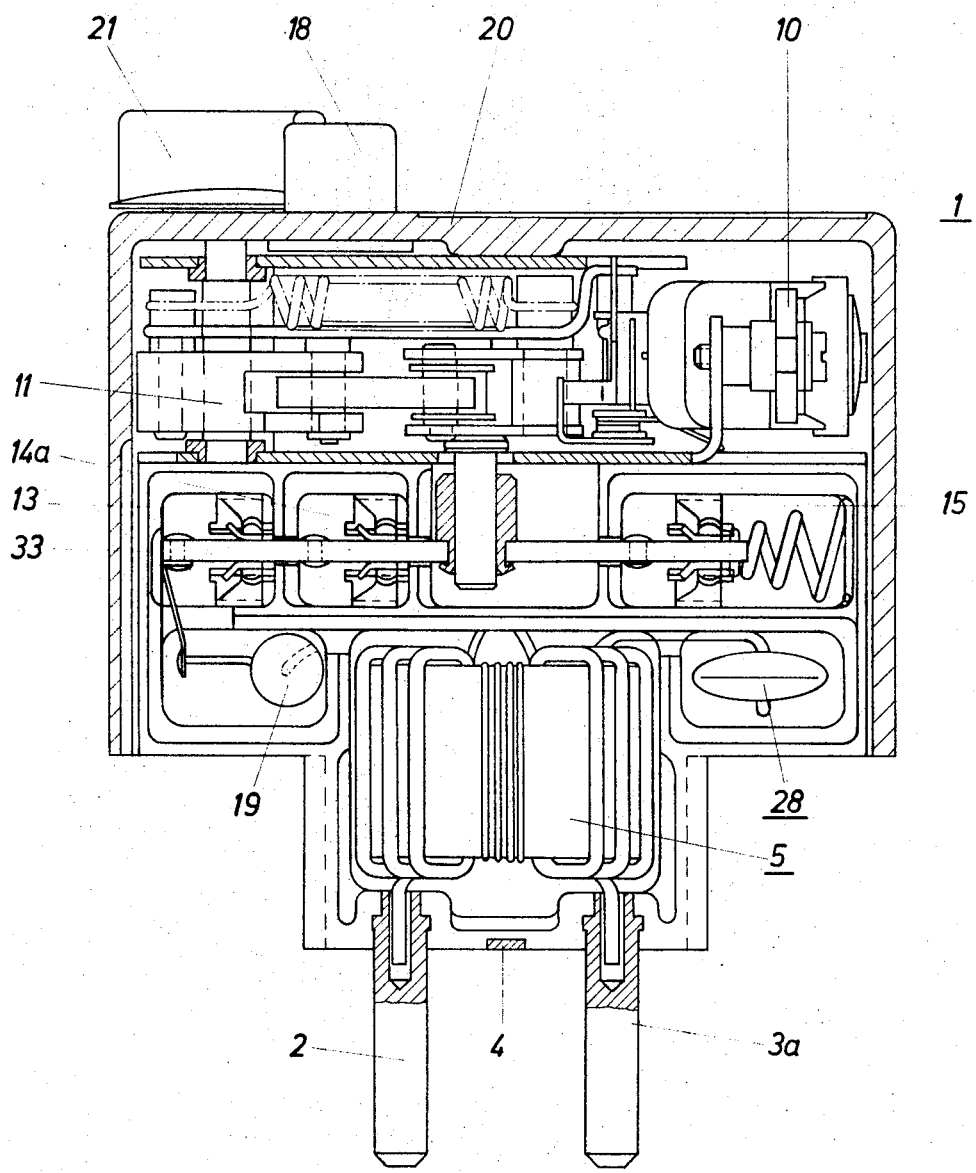
FIG. 3 is a cross section of the receptacle containing the components of the safety arrangement in detail, according to the invention.

As may be seen from FIG. 3, the outer casing 20 of receptacle 1 is of one-piece design, and contains switch lock 11 and trip magnet 10. Switch 12, core-balanced transformer 5, and the resistors, are mounted in another casing 34 which is parted at its axis of symmetry and is held together by casing 20. Thus, the whole assembly is accessible to all of its parts, and allows easy inspection and replacement of them.

The whole arrangement is not much larger than a normal receptacle so that it may be used for any kind of nonstationary appliances, for which conventionally such normal receptacles may be used. The arrangement, in addition, offers the safety features described above.

It will be understood that each of the elements described above or two or more together may also find useful application in other types of constructions differing from the types described above.

While the invention has been illustrated and described as embodied in safety arrangements for grounded supply networks, it is not intended to be limited to the details shown since various modifications and structural changes may be made without departing in any way from the spirit of the present invention.

I claim:

1. A safety arrangement for protecting against damage from electrical current in nonstationary electrical appliances connected to a grounded supply network comprising, in combination, core-balance protective switch means having a tripping current value below 50 milliamperes and having a tripping protective conductor; and including core-balance transformer means with a plurality of primary windings, said protective conductor being connected to at least one of said primary windings, the total number of turns on said one of said primary windings being at least twice the number of turns of one of said primary windings connected to one line of said grounded network; and voltage-dependent resistor means connected in series with said protective conductor, said voltage-dependent resistor means having substantially high resistance at low voltages and substantially low resistance at high voltages applied across said voltage dependent resistor means.

2. The safety arrangement for protecting against damage from electrical current in nonstationary electrical appliances connected to a grounded supply network as defined in claim 1, wherein said voltage dependent resistor means comprises two single identical voltage-dependent resistors connected in series.

3. The safety arrangement for protecting against damage from electrical current in nonstationary electrical appliances connected to a grounded supply network as defined in claim 2, wherein said series-connected voltage-dependent resistors are connected to each other so that their characteristics are directed opposite to each other.

4. The safety arrangement for protecting against damage from electrical current in nonstationary electrical appliances connected to a grounded supply network as defined in claim 3, including limiting resistor means connected in series with said voltage-dependent resistors.

5. The safety arrangement for protecting against damage from electrical current in nonstationary electrical appliances connected to a grounded supply network as defined in claim 1, including receptacle means with said core-balance protective switch means and having conductor contacts for connecting to said grounded supply network.

6. The safety arrangement for protecting against damage from electrical current in nonstationary electrical appliances connected to a grounded supply network as defined in claim 5, including two-pole feeder contact pins and additional contacts for said protective conductor.

7. The safety arrangement for protecting against damage from electrical current in nonstationary appliances connected to a grounded supply network as defined in claim 6, wherein said pole contact pins and protective conductor contacts are formed for plugging into a receptacle outlet connected to said supply network.

8. The safety arrangement for protecting against damage from electrical current in nonstationary appliances connected to a grounded supply network as defined in claim 5, including flexible cable means mounted on said receptacle means for transmitting power from said electrical supply network to said electrical appliance through said receptacle means.

9. The safety arrangement for protecting against damage from electrical current in nonstationary appliances connected to a grounded supply network as defined in claim 1, including test key means; and a test resistor connected to said test key means, said test key means being connected through said test resistor to one phase and to the neutral conductor of said network, when said core-balance protective safety switch is on.

10. The safety arrangement for protecting against damage from electrical current in nonstationary electrical appliances connected to a ground supply network comprising, in combination, a switch lock tripped by a trip magnet; a switch turning knob mounted on said switch lock for operating said switch lock; a slider positioned by said switch lock, said switch lock converting the rotary motion of said switch turning knob into translational motion for positioning said slider; a key-operated test switch; a test resistor connectable by said test switch to one phase of said supply network, said test resistor being also connectable by said test switch to the neutral conductor of said supply network; core-balance transformer means connected to said supply network; and a two-part housing for enclosing said safety arrangement.